US 6,702,395 B1

(12) United States Patent
Wang

(10) Patent No.: US 6,702,395 B1
(45) Date of Patent: Mar. 9, 2004

(54) ROTATING WING STRUCTURE OF STEEL WHEEL

(75) Inventor: Ming-Fang Wang, Tainan Hsien (TW)

(73) Assignee: Kuan Hsings Enterprise Corp., Taiwan (CN)

( * ) Notice: Subject to any disclaimer, the term of this patent is extended or adjusted under 35 U.S.C. 154(b) by 0 days.

(21) Appl. No.: 10/349,971

(22) Filed: Jan. 24, 2003

(51) Int. Cl.⁷ .............................. B60B 7/04; B60B 7/00
(52) U.S. Cl. ............................. 301/37.25; 301/37.108
(58) Field of Search ..................... 301/37.101, 37.1, 301/37.108, 37.25, 37.26, 37.371; 40/587

(56) References Cited

U.S. PATENT DOCUMENTS

| 2,762,469 A | * | 9/1956 | Lyon | 301/37.25 |
| 2,997,344 A | * | 8/1961 | Whiteman | 301/37.25 |
| 3,219,391 A | * | 11/1965 | Hettinger | 301/37.25 |
| 3,722,958 A | * | 3/1973 | Marshall | 301/37.25 |
| 5,290,094 A | * | 3/1994 | Gragg | 301/37.25 |
| 6,554,370 B2 | * | 4/2003 | Fowlkes | 301/37.25 |

* cited by examiner

Primary Examiner—S. Joseph Morano
Assistant Examiner—Jason R. Bellinger
(74) Attorney, Agent, or Firm—Bacon & Thomas, PLLC

(57) ABSTRACT

A steel wheel with a retaining base. The steel wheel includes a bearing, a turning disc, an axle disposed on the turning disc and pivotally coupled to the bearing on the retaining base. A wing plate is defined on the turning disc so that the wing plate rotates independently from the wheel cover when the vehicle is moving.

4 Claims, 3 Drawing Sheets

ROTATING WING STRUCTURE OF STEEL WHEEL

BACKGROUND OF THE INVENTION

1. Field of the Invention

This invention relates to a rotating wing structure of a steel wheel, which produces a rotating effect while a vehicle is moving or coming to a stop.

2. Description of the Related Art

The use of wheel cover for vehicles is very popular. In FIG. 1, a traditional wheel 1 cover is basically comprised of a circular disc 11; a plurality of engraved holes 12 in special shapes disposed on the circular disc 11; a plurality of latch members 13, each latch member at its end has a groove 14, such that the grooves 14 of the latch members 13 define an area for surrounding and supporting a steel ring 15, and the external periphery of the area defined by the latch members 15 propped by the steel ring 15 is embedded into the steel wheel 2.

The U.S. Pat. No. 5,490,342 entitled " Non-rotating wheel cover" disclosed a wheel cover having a turning disc with weights, so that the weights cause the wheel cover not to rotate as the wheels of a motor vehicle rotate and the motor vehicle is in motion. In other words, the turning disc remains still, so that the index on the turning disc can be read.

The U.S. Pat. No. 5,588,715 entitled " Non-rotating wheel cover assembly" disclosed a wheel cover, which is suspended and not fixed onto the steel ring of the tire. By means of the weights installed around the periphery of the wheel cover, the rotating wheel cover is kept still while the vehicle is moving. Therefore, the pattern and shape on the surface of the wheel cover can be seen clearly while the tire is rotating.

Both of the two cited patents use an axle to let the wheel rotate or make the wheel cover or the turning disc not to rotate after the circular disc of the wheel cover rotates by installing weights on the wheel cover or the turning disc. However, since different wheel covers have different implications of expression; for example, the wheel cover as shown in FIG. 1 of this invention is completely fixed onto the steel wheel of the tire and does not rotate, and no index will be observed on the wheel cover when the vehicle is moving. As mentioned in the two cited U.S. Pat. Nos. 5,490,342 and 5,588,715, both use bearing for the rotation, or even use weights to keep the wheel cover or the disc still, but the effects and implications so produced are different.

SUMMARY OF THE INVENTION

The objective of this invention is to provide an improved rotating wing structure of a steel wheel, which comprises a retaining base disposed on the steel wheel; a bearing disposed on the retaining base; a turning disc, having an axle pivotally coupled to the bearing on the retaining base; the turning disc forms a wing plate so that the wing plate can rotate the steel ring and the wheel cover while the vehicle is moving.

BRIEF DESCRIPTION OF THE DRAWINGS

Other features and advantages of the present invention will become apparent in the following detailed description of the preferred embodiments with reference to accompanying drawings, in which.

DETAILED DESCRIPTION OF THE PREFERRED EMBODIMENTS

Figure 1:
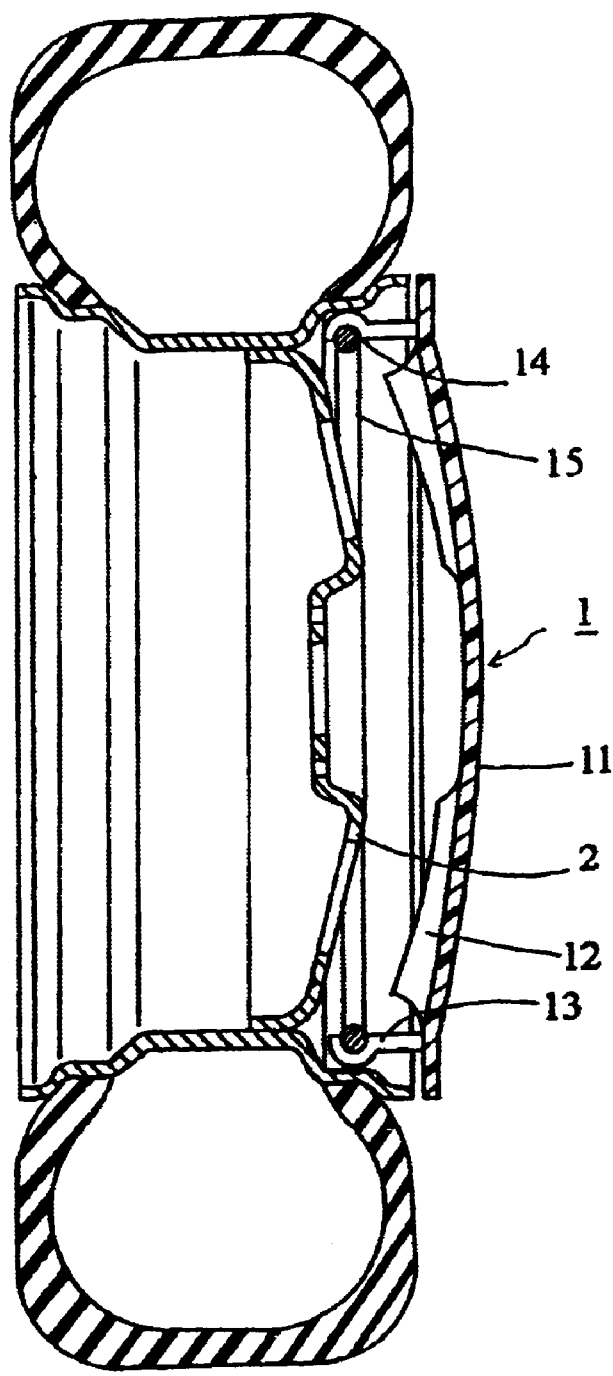
FIG. 1 is a cross-sectional diagram of a prior art steel wheel being embedded into a wheel cover.

In the detailed description of the preferred embodiments, it should be noted that like elements are indicated by the same reference numerals throughout the disclosure.

Figure 2:
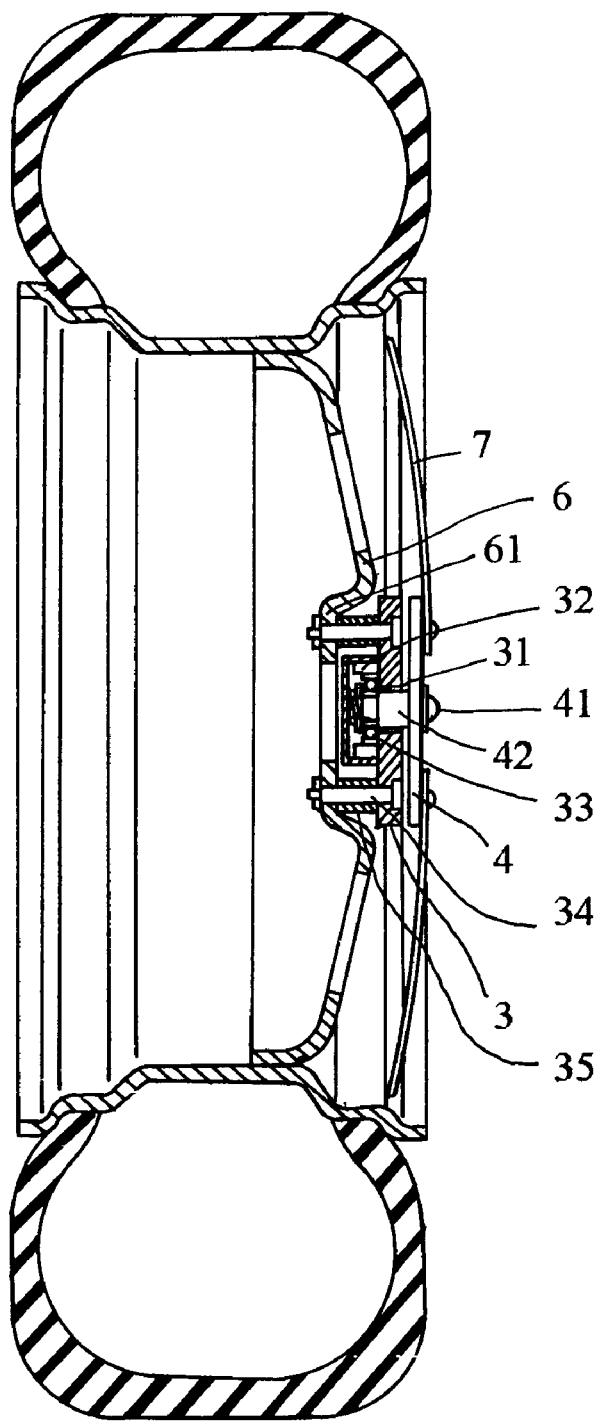
FIG 2. diagram of the cross-sectional structure a preferred embodiment of the present invention.
Figure 3:
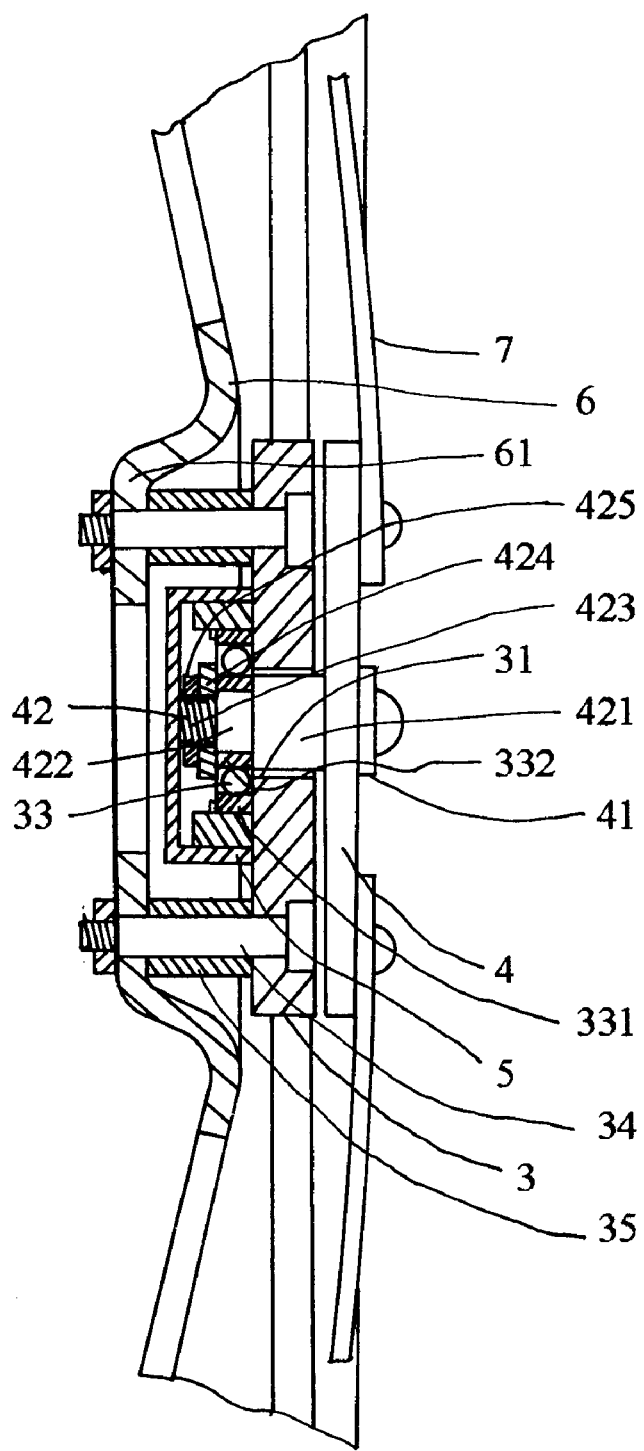
FIG. 3. sectional diagram of an enlarged section of FIG. 2.

Please refer to FIGS. 2 and 3 for a preferred embodiment of the present invention, which comprises a retaining base 3; an axle hole 31 disposed in the middle of the retaining base 3;

a fixed base 32 on the backside of the retaining base 3; a bearing 33 is disposed in the fixed base 32 such that an external axle ring 331 of the bearing 33 is fixed and positioned onto the fixed base 32; a turning disc 4 is mounted onto an axle 42 disposed on a side of the turning disc 4 by a screw member 41, and the axle 42 has three diameters at three different sections, the diameter of the first section 421 is disposed in the axle hole 31 of the retaining base 3 keeping a gap with the axle hole 31 for the rotation; the diameter of the second section 422 is slightly smaller than the diameter of the first section 421 and is disposed in the internal axle ring 332 in the bearing 33, and linked to the internal axle ring 332; the diameter of the third section 423 forms a thread and is fixed onto the washer 424 by screw nut 425 after coupling to the washer 424; a cover 5 is disposed on the outside of the bearing 33 to prevent dust from entering into and affecting the operation of the bearing 33; the retaining base 3 is mounted and secured to the axle base 61 in the middle of the steel wheel 6 by a plurality of screw bolts 34 and an isolating member 35 is set between the retaining base 3 and the axle base 61 to keep the retaining base 3 and the axle base 61 in an appropriate distance; the turning disc 4 has a plurality of wing plates 7 mounted equidistantly on the turning disc 4 by a plurality of screws, each wing plate 7 can be placed horizontally or tilted with an angle, or placed horizontally but bent towards the periphery of the steel wheel 6; the plurality of wing plates 7 can be When the vehicle is moving and the steel wheel 6 of the tire is rotating, the retaining base 3 also rotates accordingly because it is fixed onto the steel wheel 6. The retaining base 3 is secured to a vehicle wheel 6 and is rotated with the rotation of the vehicle wheel 6. This rotation causes air to flow past the wing plates 7 thus causing the wing plates to rotate in a direction opposite that of the rotation of the wheel 6 and the retaining base 3. Even when the vehicle comes to a stop, the airflow or wind of the external environment also blows the wing plates 7 and produces the rotation.

In view of the above description, the steel wheel of the preferred embodiment of the present invention comprises a plurality of rotating wing plates, and the rotation of the wing plates provides a lively movement to the steel wheel. The turning disc is a rotating wing plate or a disc member by itself, The movement of the vehicle causes the wheel 6 and the retaining base 3 (the portion of the device that is mounted to the wheel 6 and thus stationary with respect to the turning disc 4 and the wing plates 7) to rotate, while the turning disc 4 attached with wing plates 7 rotates independently of the wheel 6 and the retaining base 3.

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed:

1. A rotating wing structure of a steel wheel. comprising:
   a retaining base mounted onto a steel wheel and having a bearing;
   a turning disc having an axis rotationally coupled to said bearing;
   a plurality of wing plates disposed around the turning disc, the wing plates rotate independently of the rotation of the retaining base and the steel wheel;
   an axle hole;
   a fixed base disposed on the backside of the retaining base; said bearing is disposed in the fixed base; and
   an external axle ring of the bearing is fixed onto the fixed base.

2. A rotating wing structure of a steel wheel, comprising:
   a retaining base mounted onto a steel wheel and having a bearing;
   a turning disc having an axle rotationally coupled to said bearing;
   a wing plate disposed on the turning disc the turning disc being an independent disc and the wing plate rotates independently of the rotation of the retaining base and the steel wheel;
   a fixed base disposed on the backside of the wheel cover, and said bearing is disposed in the fixed base; and
   an external axle ring of the bearing is fixed onto the fixed base.

3. A rotating wing structure of a steel wheel, comprising:
   a retaining base mounted onto a steel wheel and having a bearing;
   a turning disc having an axle rotationally coupled to said bearing;
   a wing plate disposed on the turning disc the turning disc being an independent disc and the wing plate rotates independently of the rotation of the retaining base and the steel wheel,
   said axle of the turning disc comprises three diameters at three sections;
   the diameter of the first section is disposed in said axle hole of the wheel cover; the diameter of the second section is slightly smaller than the diameter of the first section and disposed in the internal axle ring of the bearing; and
   the diameter of the third section forms a thread and is mounted onto the bearing by nut.

4. A rotating wing structure of a steel wheel, comprising:
   a retaining base mounted onto a steel wheel and having a bearing;
   a turning disc having an axle rotationally coupled to said bearing and the turning disc itself is a rotating wing plate or a disc that rotates independently of the rotation of the retaining base and the steel wheel;
   an axle hole and a fixed base disposed on the backside of the wheel cover; said bearing is disposed in the fixed base; and
   an external axle ring of the bearing is fixed onto the fixed base.

\* \* \* \* \*